United States Patent
Saint Medar et al.

(10) Patent No.: US 11,845,385 B2
(45) Date of Patent: Dec. 19, 2023

(54) INSULATING ELEMENT

(71) Applicant: SIKA TECHNOLOGY AG, Baar (CH)

(72) Inventors: Gino Saint Medar, Uccle (BE); Didier Henrion, Vilvoorde (BE); Dimitri Marcq, Tubize (BE)

(73) Assignee: SIKA TECHNOLOGY AG, Baar (CH)

( * ) Notice: Subject to any disclaimer, the term of this patent is extended or adjusted under 35 U.S.C. 154(b) by 210 days.

(21) Appl. No.: 17/432,582

(22) PCT Filed: Mar. 19, 2020

(86) PCT No.: PCT/EP2020/057708
§ 371 (c)(1),
(2) Date: Aug. 20, 2021

(87) PCT Pub. No.: WO2020/193381
PCT Pub. Date: Oct. 1, 2020

(65) Prior Publication Data
US 2022/0126765 A1    Apr. 28, 2022

(30) Foreign Application Priority Data
Mar. 22, 2019 (EP) .................................... 19164685

(51) Int. Cl.
*B60R 13/08* (2006.01)
*B62D 29/00* (2006.01)

(52) U.S. Cl.
CPC ............. *B60R 13/08* (2013.01); *B62D 29/002* (2013.01); *Y10T 428/24008* (2015.01)

(58) Field of Classification Search
None
See application file for complete search history.

(56) References Cited

U.S. PATENT DOCUMENTS

| | | |
|---|---|---|
| 5,266,133 A | 11/1993 | Hanley et al. |
| 5,373,027 A | 12/1994 | Hanley et al. |
| 5,766,719 A | 6/1998 | Rimkus |
| 5,904,024 A | 5/1999 | Miwa |
| 6,387,470 B1 | 5/2002 | Chang et al. |
| 2004/0124553 A1 | 7/2004 | Czaplicki et al. |

(Continued)

FOREIGN PATENT DOCUMENTS

| | | |
|---|---|---|
| EP | 0 204 970 A2 | 12/1986 |
| EP | 0 679 501 A1 | 11/1995 |

(Continued)

OTHER PUBLICATIONS

Translation of JP2000238589 (Year: 2023).*

(Continued)

*Primary Examiner* — Alexander S Thomas
(74) *Attorney, Agent, or Firm* — Oliff PLC

(57) ABSTRACT

An insulating element for insulating a structural element in a vehicle includes a carrier which has a first wall and a second wall. A first rib and a second rib are arranged between the walls. The insulating element also includes an expandable material which is arranged between the walls and on both sides of each rib. The insulating element also includes a fastening element for fastening the insulating element in the structural element.

17 Claims, 4 Drawing Sheets

A-A

(56) References Cited

U.S. PATENT DOCUMENTS

2009/0223739 A1* 9/2009 Duffin .................. B29C 44/188
                                                              181/196
2019/0126855 A1    5/2019 Ulmann

FOREIGN PATENT DOCUMENTS

| JP | 2000238589 A | * | 9/2000 |
| WO | 98/36944 A1 | | 8/1998 |
| WO | 2005/080524 A1 | | 9/2005 |
| WO | 2017/182606 A1 | | 10/2017 |

OTHER PUBLICATIONS

May 11, 2020 International Search Report issued in International Patent Application No. PCT/EP2020/057708.

Sep. 28, 2021 International Preliminary Report on Patentability issued in International Patent Application No. PCT/EP2020/057708.

* cited by examiner

INSULATING ELEMENT

The invention relates to an insulating element for insulating a structural element in a motor vehicle.

In many cases, components, such as for example bodies and/or frames of transportation and conveyance means, in particular of aquatic or terrestrial vehicles or of aircraft, have structures with cavities in order to make lightweight constructions possible. However, these cavities cause a wide variety of problems. Depending on the type of the cavity, the latter has to be sealed in order to prevent the ingress of moisture and dirt, which can lead to the corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or a narrow extent, making it more difficult to seal, reinforce and damp them properly.

In particular in automotive construction, but also in aircraft construction and boat building, sealing elements (baffles) are therefore used in order to seal and/or acoustically insulate cavities, or reinforcing elements (reinforcers) are used in order to reinforce cavities.

FIG. 1 schematically illustrates a body of an automobile. Here, the vehicle body 10 has various structures with cavities, such as for example pillars 14 and carriers or braces 12. Such structural elements 12, 14 with cavities are usually sealed and/or reinforced, respectively, using sealing and/or reinforcing elements 16.

It is a disadvantage of the previously known sealing and/or reinforcing elements that, for each vehicle body shape and for each cavity of a vehicle body, an individually adapted element has to be produced. This leads to high development and production costs and is disadvantageous in particular in the case of relatively small vehicle series.

It is therefore an object of the present invention to provide an improved insulating element for insulating a structural element in a motor vehicle, which avoids the disadvantages of the prior art. The insulating element is intended to give rise in particular to economic advantages in the case of small series and to reduce the development and production complexity of the insulating elements overall.

This object is achieved by an insulating element for insulating a structural element in a motor vehicle, the insulating element comprising: a carrier with a first wall and a second wall, wherein the walls are designed and disposed so as to be substantially congruent, and wherein the walls each have opposite first edges and second edges, and with a first rib and a second rib, wherein the ribs are disposed between the walls, and wherein the ribs each extend between the first edge and the second edge, wherein the ribs each are at least half as long as a total distance between the first edges and the second edges in the direction of the ribs; an expandable material which is disposed between the walls and which is disposed on either side of the ribs; and a fixing element for fixing the insulating element in the structural element, wherein the fixing element is disposed in a region of the first edges of the walls.

This solution has the advantage that, as a result thereof, an insulating element which guarantees that cavities are filled in a very efficient manner with foam is provided. Due to the sandwich-like construction, the expandable material is already directed in a desired direction during expansion. Ribs that are disposed between the walls now further improve this directional effect. On the one hand, the ribs channel the expansion in the longitudinal direction of the ribs, that is to say substantially beyond the second edge of the walls, which is desirable because the largest gap between the carrier and the structural element often has to be overcome in this direction. The ribs furthermore have the effect that the expandable material can be supported on these two ribs during the expansion process. Depending on the spatial alignment of the insulating element, it can specifically happen that the expansion is deflected in an undesired direction by gravity. The ribs here guarantee that the expansive behavior is as stable as possible in the desired direction, regardless of the spatial orientation of the insulating element.

A key concept of the present invention is in particular that a number of differently shaped cavities can be insulated by a standardized insulating element. As a result of the improved guidance of the expansion process by the walls and by the ribs, the insulation element proposed here can also be used to insulate cavities which have larger gaps between the carrier and the structural element. For this reason, the insulation element proposed here can be used both for structural elements with large gaps and for structural elements with small gaps between the carrier and the structural element. This offers the advantage that the insulating element can be produced in large numbers, which is advantageous in terms of tool costs and development costs. In the case of injection molding processes in particular, a large number of items is necessary in order to be able to produce in a cost-efficient manner.

In the context of this invention, the term "insulating element" or "insulation" or "insulated" comprises elements or structures or method steps for partitioning and/or closing off and/or reinforcing and/or insulating a structural element. This variety of characteristics of such an insulating element can in this case arise individually or else in combination with one another.

In an exemplary embodiment, the walls are configured so as to be substantially quadrangular and/or rectangular.

Such a design embodiment of the walls has the advantage that, as a result thereof, a compact insulating element which has a substantially cuboid shape can be achieved. A multiplicity of cavities in structural elements can be insulated by such a shape.

In an alternative embodiment, the walls have a substantially round, polygonal, oval or irregular footprint.

In an exemplary embodiment, the walls are configured so as to be substantially flat.

Substantially flat walls offer the advantage that, as a result thereof, the direction of the expandable material during the expansion of the latter can be optimally guided in the cross-sectional direction of the structural element.

In an exemplary embodiment, the ribs extend so as to be substantially orthogonal to the first edges and/or to the second edges.

Such an alignment of the ribs has the advantage that, as a result thereof, the expandable material, while expanding, is efficiently guided in a direction towards a wall of the structural element which is opposite a wall of the structural element to which the insulating element is fixed. As a result, a large spacing between the insulating element and the opposite wall of the structural element can be bridged. Moreover, such an alignment of the ribs has the advantage that, with the walls of the structural element running vertically, it is achieved that the material is supported against the effect of gravity.

In an alternative embodiment, the ribs extend at an angle relative to an orthogonal to the first edges and/or second edges, wherein the angle is 0° to 30°, or 5° to 25°, or 5° to 20°.

The ribs can be angled so that said ribs are aligned so as to be substantially parallel, or the ribs can be aligned such that said ribs are disposed at a mutual angle. An angle between the ribs which tapers in the direction of the first edge and which opens in the direction of the second edge is particularly advantageous here.

In an exemplary embodiment, the ribs are each at least 60% or 70% or 80% or 90% as long as a total distance between the first edges and the second edges in the direction of the ribs.

In an exemplary embodiment, the ribs subdivide a volume between the two walls in such a manner that between 30% and 70% or 35% and 65% or 40% and 60% of this volume is disposed between the ribs.

This subdivision of the volume between the two walls here is to be understood as meaning that ribs or, if necessary, the extension of said ribs, is used to subdivide the volume.

Depending on whether an expansion is to be carried out so as to increase in the direction of the ribs or increase transversely to a direction of the ribs, the volume can be divided differently by the ribs.

In an exemplary embodiment, the ribs extend substantially to the first edges of the walls, but are spaced apart from the second edges of the walls by a spacing.

In an exemplary embodiment, this spacing is at least 10% or 15% or 20% or 25% or 30% of a length of the ribs.

In an exemplary embodiment, the expandable material is disposed on 50% to 95% or on 60% to 95% or on 70% to 90% of a base area of the walls.

A quantity of the expandable material, or a disposal on the walls of the expandable material, here can be individually adapted as a function of the expansion rate and as a function of the size of the cavity of the structural element, without the carrier of the insulating element having to be changed herein.

In an exemplary embodiment, a region of the walls directly at the second edges is in each case free of expandable material.

In an exemplary embodiment, a rib is disposed on at least one of the first edges, said rib extending so as to be substantially perpendicular to the walls.

In an exemplary development, such ribs are disposed on both first edges.

In an exemplary development, this rib, or these ribs, is/are dimensioned and disposed in such a way that, as a result thereof, a cross section of an opening between the two first edges in comparison to a situation without ribs is reduced by at least 10% or at least 20% or at least 30% or at least 40% or at least 50%.

In an exemplary refinement, this rib, or these ribs, extends/extend across an entire length of the first edge(s).

Such ribs on the first edges have the advantage that, as a result thereof, a direction of expansion can be increasingly deflected away from the opening between the first edges, this potentially being advantageous depending on the application.

In one exemplary embodiment, the fastening element is in the form of a clip.

In an exemplary embodiment, the fastening element is configured so as to be integral to the carrier and/or from the same material as the carrier.

In an exemplary embodiment, the insulating element comprises spacer elements which support the insulating element on the structural element when the insulating element is fastened to the structural element by the fastening element.

Such spacer elements have the advantage that, as a result thereof, a position of the insulating element in the structural element can be defined more precisely.

In an exemplary refinement a spacer element is in each case disposed on each side of the fastening element.

In a further exemplary development, the spacer elements are configured so as to be flexible.

In principle, various materials which can be made to foam can be used as the expandable material. The material here may or may not have reinforcing properties. Typically, the expandable material is caused to expand thermally, by moisture or by electromagnetic radiation.

Such an expandable material typically has a chemical or a physical foaming agent. Chemical foaming agents are organic or inorganic compounds which decompose under the influence of temperature, moisture or electromagnetic radiation, wherein at least one of the decomposition products is a gas. Compounds which transition into the gaseous aggregate state when the temperature is increased may for example be used as physical foaming agents. As a result, both chemical and physical foaming agents are capable of creating foam structures in polymers.

The expandable material is preferably foamed thermally, with chemical foaming agents being used. Examples of suitable chemical foaming agents are azodicarbonamides, sulfohydrazides, hydrogen carbonates or carbonates.

Suitable foaming agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of ≤250° C., in particular from 100° C. to 250° C., preferably from 120° C. to 240° C., preferably from 130° C. to 230° C.

Suitable expandable materials are, for example, one-component epoxy resin systems which do not flow at room temperature and in particular have increased impact resistance and contain thixotropic agents such as aerosils or nanoclays. For example, epoxy resin systems of this type include 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable catalysts. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing foaming agents and based on crystalline polyesters which comprise OH groups and have been mixed with further polyols, preferably polyether polyols, and polyisocyanates with blocked isocyanate groups. The melting point of the crystalline polyester should be ≥50° C. The isocyanate groups of the polyisocyanate can be blocked for example by nucleophiles such as caprolactam, phenols or benzoxalones. Also suitable are blocked polyisocyanates such as are used, for example, in powder-coating technology and are commercially available, for example, under the trade names Vestagon® BF 1350 and Vestagon® BF 1540 from Degussa GmbH, Germany. Also as isocyanates are so-called encapsulated or surface-deactivated polyisocyanates which are known to a person skilled in the art and are described, for example, in EP 0 204 970.

Also suitable as expandable materials are two-component epoxy/polyurethane compositions which contain foaming agents, such as are described, for example, in WO 2005/080524 A1.

Also suitable as expandable materials are ethylene-vinyl acetate compositions containing foaming agents.

Expandable materials that are likewise suitable are marketed by Sika Corp., USA, for example under the trade name SikaBaffle® 240, SikaBaffle® 250 or SikaBaffle® 255, and are described in patents U.S. Pat. Nos. 5,266,133 and 5,373,027. Such expandable materials are particularly preferred for the present invention.

Preferred expandable materials with reinforcing properties are for example those marketed by Sika Corp., USA under the trade name SikaReinforcer® 941. These are described in U.S. Pat. No. 6,387,470.

In an exemplary embodiment, the expandable material has an expansion rate from 800% to 5000%, preferably from 1000% to 4000%, particularly preferably from 1500% to 3000%. Expandable materials with such expansion rates offer the advantage that reliable sealing or insulating of the structural element in relation to liquids and noise can be achieved as a result In one exemplary embodiment, the expandable material is in the form of a temperature-stimulated material.

This has the advantage that, as a result, the furnace for baking the dip coating liquid can be used to expand the expandable material and to thus insulate the cavity. Consequently, an additional work step is not necessary.

The carrier may consist of any desired materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used.

Furthermore, the carrier can have any desired construction and any desired structure. It may for example be solid, hollow or foamed, or have a grid-like structure. Typically, the surface of the carrier can be smooth, rough or structured.

In the case of insulating elements in which the expandable material is located on a carrier, the production process differs according to whether the carrier consists or does not consist of a material that can be processed by injection molding. In the affirmative, a two-component injection molding process is usually used. In this case, first of all a first component, in this case the carrier, is injected. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, that is to say for example of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

The object set in the introduction is additionally achieved by a system in a motor vehicle, the system comprising: a structural element which has a cavity; and an insulating element according to the description above; wherein the insulating element is arranged in the cavity of the structural element.

In one exemplary embodiment, the structural element is a portion of a column or of a carrier or of a brace of a motor vehicle body.

Details and advantages of the invention will be described hereunder by means of exemplary embodiments and with reference to schematic drawings. In the drawings.

Figure 1:
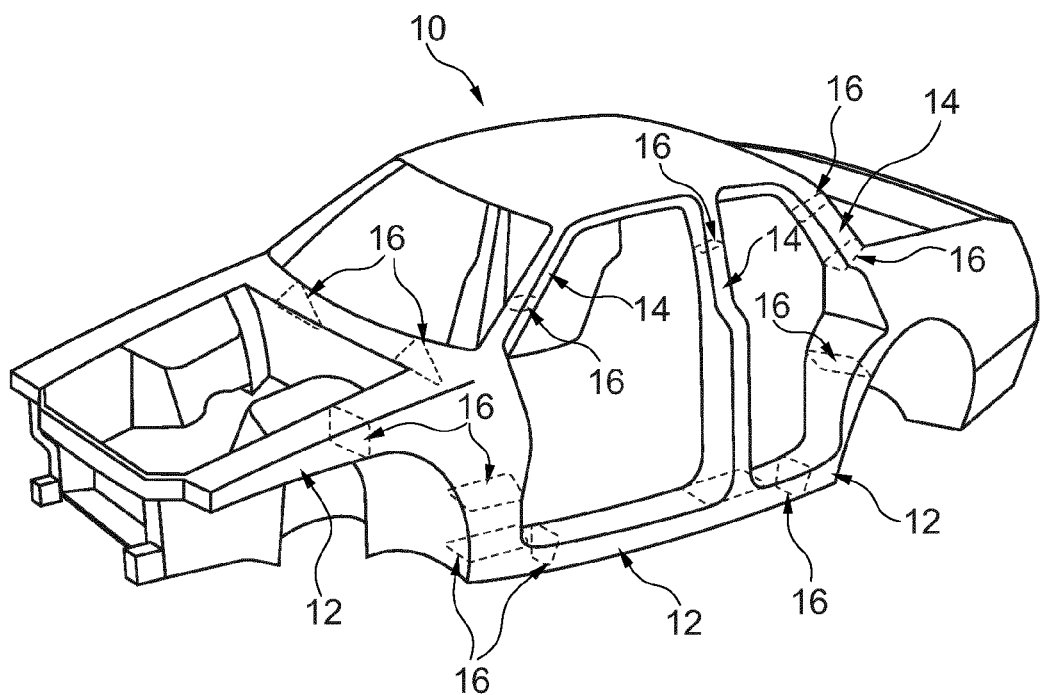
FIG. 1 shows an exemplary illustration of a body.
Figure 2:
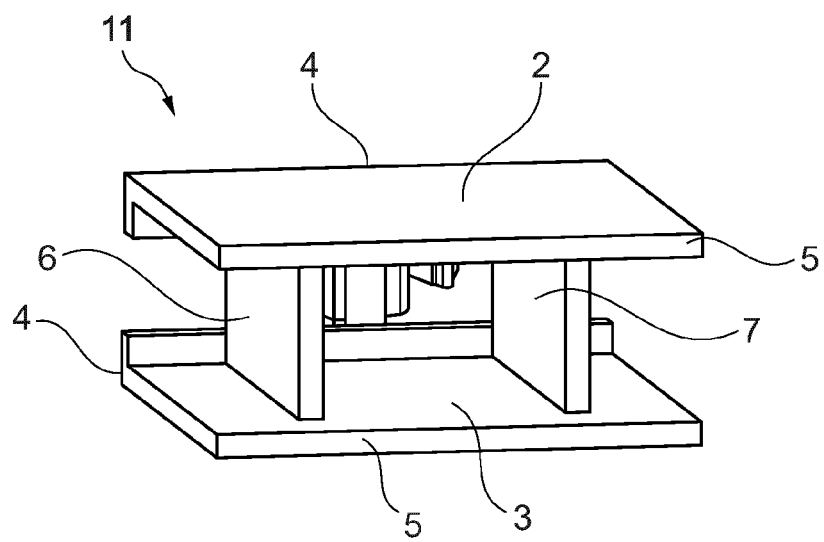
FIG. 2 shows a schematic illustration of an exemplary carrier.

In FIG. 2, a carrier 11 is shown in a schematic and exemplary manner. The carrier 11 has a first wall 2 and a second wall 3, which are designed and disposed so as to be substantially congruent. The two walls 2, 3 each have a first edge 4 and a second edge 5. A first rib 6 and a second rib 7 are disposed between the first wall 2 and the second wall 3. These ribs 6, 7 each extend between the first edges 4 and the second edges 5 of the walls 2, 3. The ribs 6, 7 here are each at least half as long as a total distance between the first edges 4 and the second edges 5 in the direction of the ribs 6, 7.

In this embodiment, the walls 2, 3 have a square footprint and are configured so as to be flat. Moreover, the walls in this exemplary embodiment have in each case a rib on the first edges 4, said rib extending so as to be perpendicular to the walls 2, 3.

Figure 3:
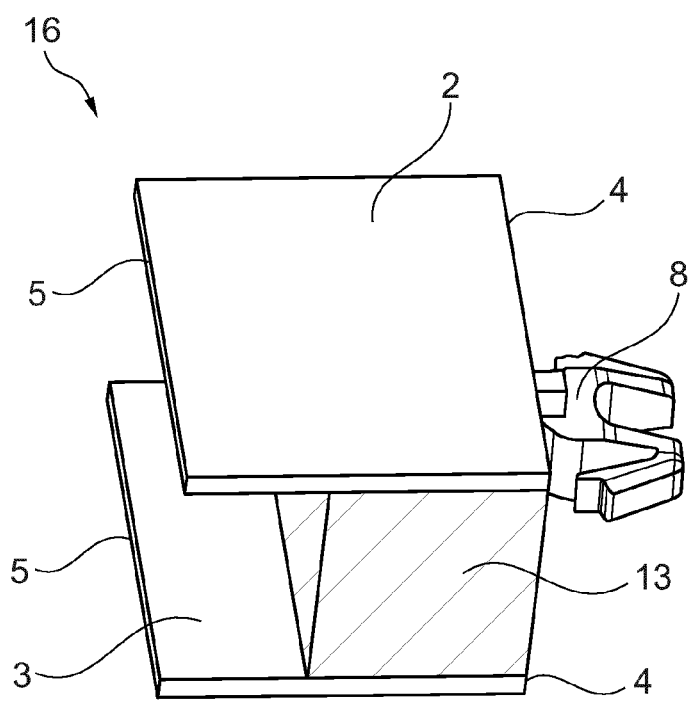
FIG. 3 shows a schematic illustration of an exemplary insulating element.

An insulating element 16 which is illustrated in a schematic and exemplary manner is shown in FIG. 3. The carrier in turn comprises a first wall 2 and a second wall 3, each having a first edge 4 and a second edge 5. The expandable material 13 is now disposed between the walls 2, 3. The ribs cannot be seen in this illustration because said ribs in this exemplary embodiment are completely enclosed by the expandable material 13. The insulating element 16 furthermore comprises a fixing element 8 which is disposed in a region of the first edges 4 of the walls 2, 3. In this exemplary embodiment, the fixing element 8 is configured as a clip.

Figure 4A:
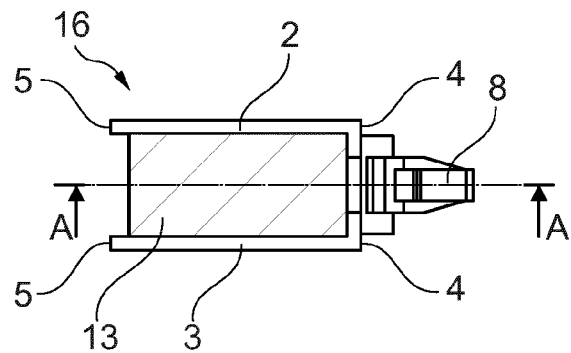
FIGS. 4a to 4c show a schematic illustration of an exemplary insulating element.
Figure 4B:
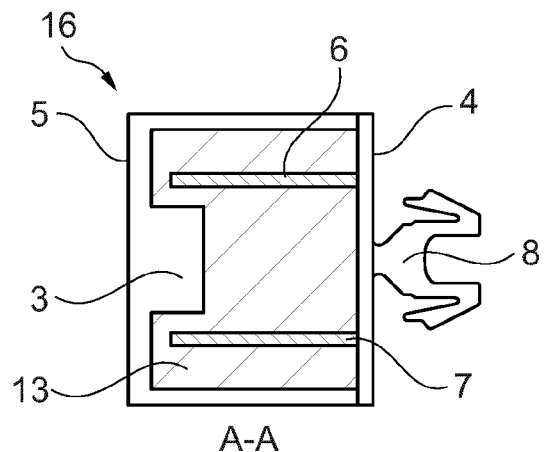
Figure 4C:
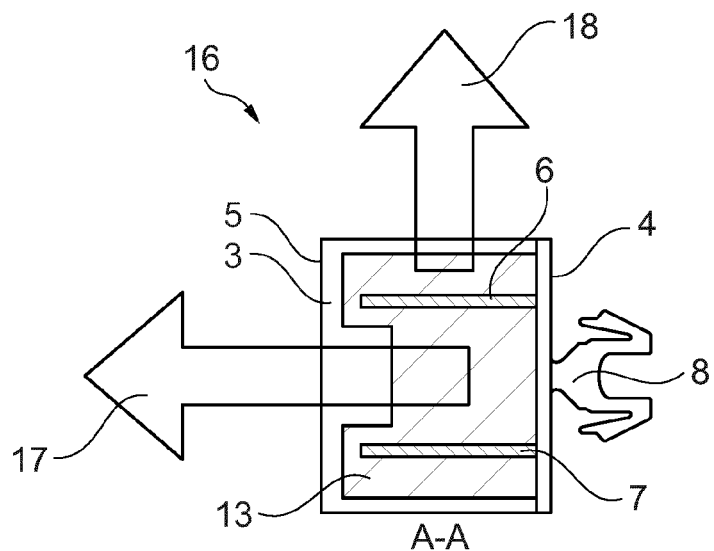

A further exemplary insulating element 16 is schematically shown in FIGS. 4a to 4c. The insulating element 16 is shown in a lateral view in FIG. 4a, and the same insulating element 16 is then illustrated along the section line A-A of FIG. 4a in FIGS. 4b and 4c.

It can be seen in the sectional illustration of FIG. 4b that the expandable material 13 is disposed on both sides of the ribs 6, 7.

A first direction 17 and a second direction 18 are also shown in the sectional illustration of FIG. 4c. Due to the specific disposal of the ribs 6, 7, the expandable material 13, while expanding, is guided increasingly in the first direction 17 in that a channel effect is created between the ribs 6, 7.

As a result, the expandable material 13 can expand further in the first direction than would be the case without ribs 6, 7.

In a horizontal alignment of the structural element (not shown), the insulating element 16 can be oriented in space as shown in FIG. 4c. In such a case, the ribs 6, 7, in this exemplary embodiment the first rib 6, support/supports an expansion of the expandable material 13 in the second direction 18. In such situations there is specifically the problem that the expandable material 13, while expanding, can be undesirably deflected by gravity. In this case, the rib 6 now offers a support for the expandable material 13, such that the expandable material 13 can expand further in the second direction 18 than would be the case without the first rib 6.

Figure 5:
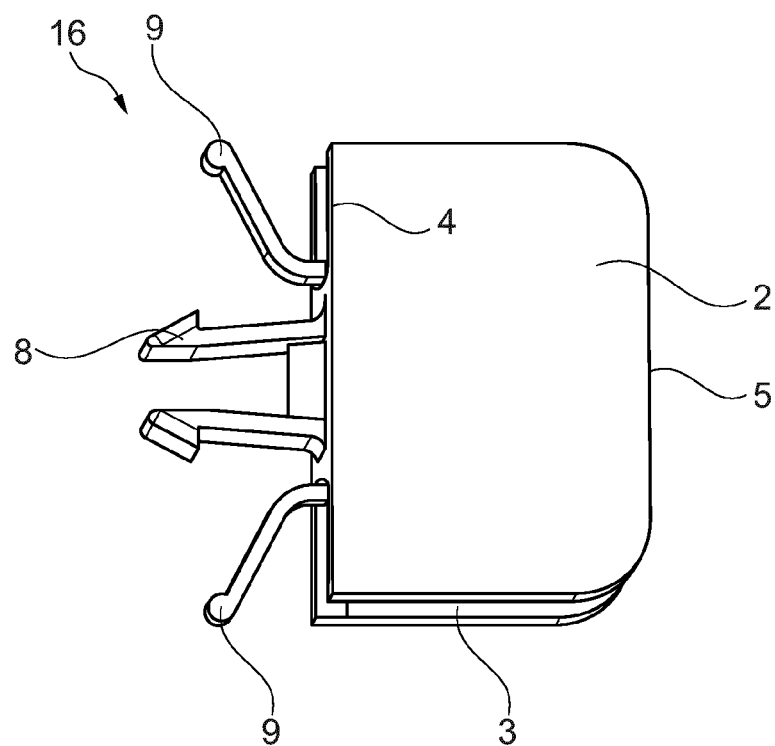
FIG. 5 shows a schematic illustration of an exemplary insulating element.
Figure 6:
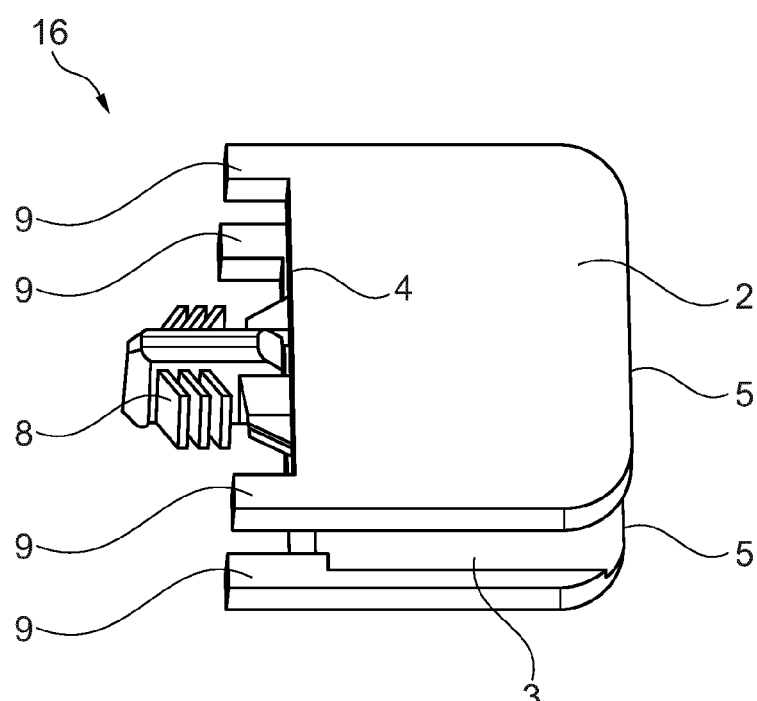
FIG. 6 shows a schematic representation of an exemplary insulating element.

Two further exemplary embodiments of insulating elements 16 are schematically shown in FIGS. 5 and 6. In these exemplary embodiments, the insulating element 16 additionally has spacer elements 9. In FIG. 5, these spacer elements 9 are in each case disposed on both sides of the fixing element 8. And in FIG. 6, these spacer elements 9 are in each case configured as extensions of the first wall 2 and the second wall 3 in the area of the first edge 4. The ribs and also the expandable material cannot be seen in each of these exemplary embodiments.

LIST OF REFERENCE DESIGNATIONS

2 First wall
3 Second wall
4 First edge
5 Second edge
6 First rib
7 Second rib
8 Fixing element
9 Spacer element
10 Vehicle body
11 Carrier
12 Structural element
13 Expandable material
14 Structural element
16 Insulating element
17 First direction
18 Second direction

The invention claimed is:

1. An insulating element for insulating a structural element in a motor vehicle, the insulating element comprising:
a carrier with a first wall and a second wall, the walls being designed and disposed so as to be substantially congruent, and the walls each having opposite first edges and second edges, and with a first rib and a second rib, the ribs being disposed between the walls, and the ribs each extending between the first edge and the second edge, the ribs each being at least half as long as a total distance between the first edges and the second edges in the direction of the ribs;
an expandable material which is disposed between the walls and which is in each case disposed on both sides of the ribs; and
a fixing element for fixing the insulating element in the structural element, the fixing element being disposed in a region of the first edges of the walls,
wherein the walls are configured to guide expansion of the expandable material.

2. The insulating element as claimed in claim 1, wherein the walls are configured so as to be substantially at least one of quadrangular, rectangular, and flat.

3. The insulating element as claimed in claim 1, wherein the ribs extend so as to be substantially orthogonal to at least one of the first edges and the second edges.

4. The insulating element as claimed in claim 1, wherein the ribs extend at an angle relative to an orthogonal to at least one of the first edges and second edges, and
the angle is 0° to 30°.

5. The insulating element as claimed in claim 1, wherein the ribs are each at least 60% as long as a total distance between the first edges and the second edges in the direction of the ribs.

6. The insulating element as claimed in claim 1, wherein the ribs subdivide a volume between the two walls in such a manner that between 30% and 80% of this volume is disposed between the ribs.

7. The insulating element as claimed in claim 1, wherein the ribs extend substantially up to the first edges of the walls, but are spaced apart from the second edges of the walls by a spacing.

8. The insulating element as claimed in claim 7, wherein this spacing is at least 10% of a length of the ribs.

9. The insulating element as claimed in claim 1, wherein the expandable material has an expansion rate of 800% to 5000%.

10. The insulating element as claimed in claim 1, wherein the expandable material is disposed on 50% to 95% of a base area of the walls.

11. The insulating element as claimed in claim 1, wherein a region of the walls directly at the second edges is in each case free of expandable material.

12. The insulating element as claimed in claim 1, wherein at least one of (i) the fixing element is designed as a clip, and (ii) the fixing element is configured so as to be integral to the carrier.

13. The insulating element as claimed in claim 1, wherein the insulating element comprises one or more spacer elements which support the insulating element on the structural element when the insulating element is fastened to the structural element by way of the fixing element.

14. The insulating element as claimed in claim 13, wherein (i) a spacer element is in each case disposed on each side of the fixing element, and (ii) wherein the spacer elements are configured so as to be flexible.

15. A system in a motor vehicle, the system comprising:
a structural element which has a cavity; and
an insulating element as claimed in claim 1,
wherein the insulating element is disposed in the cavity of the structural element.

16. The insulating element as claimed in claim 1, wherein the walls are configured to guide expansion of the expandable material in a first direction along a channel defined by a space between the ribs, and a second direction orthogonal to the first direction.

17. The insulating element as claimed in claim 1, wherein the expandable material includes at least one composition selected from the group consisting of two-component epoxy/polyurethane compositions, ethylene-vinyl acetate compositions, one-component polyurethane compositions containing at least one foaming agent and based on at least one crystalline polyester which comprises OH groups and has been mixed with polyols and polyisocyanates with blocked isocyanate groups, and one-component epoxy resin compositions which contain thixotropic agents.

* * * * *